US008972364B2

(12) United States Patent  
Harris et al.

(10) Patent No.: US 8,972,364 B2
(45) Date of Patent: Mar. 3, 2015

(54) DEFINING NEW RULES FOR VALIDATION OF NETWORK DEVICES

(71) Applicant: Sony Computer Entertainment America LLC, San Mateo, CA (US)

(72) Inventors: Adam P. Harris, San Diego, CA (US); Steve C. Schneider, San Diego, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 0 days.

(21) Appl. No.: 14/149,545

(22) Filed: Jan. 7, 2014

(65) Prior Publication Data

US 2014/0187316 A1    Jul. 3, 2014

Related U.S. Application Data

(63) Continuation of application No. 13/252,150, filed on Oct. 3, 2011, now Pat. No. 8,626,710, which is a continuation of application No. 12/352,590, filed on Jan. 12, 2009, now Pat. No. 8,032,502, which is a continuation of application No. 11/386,039, filed on Mar. 20, 2006, now Pat. No. 7,480,656.

(51) Int. Cl.
*G06F 17/30* (2006.01)
*A63F 13/30* (2014.01)
(Continued)

(52) U.S. Cl.
CPC ............... *A63F 13/12* (2013.01); *A63F 13/02* (2013.01); *A63F 13/06* (2013.01); *A63F 2300/1031* (2013.01); *A63F 2300/807* (2013.01); *Y10S 707/99939* (2013.01)
USPC ............... 707/694; 707/622; 463/29; 463/42; 707/999.009

(58) Field of Classification Search
CPC ............... A63F 13/10; A63F 2300/55; A63F 2300/5546; A63F 2300/556; A63F 2300/5566; A63F 2300/558; A63F 2300/5586
USPC ............... 463/29, 42; 707/622, 694
See application file for complete search history.

(56) References Cited

U.S. PATENT DOCUMENTS 5,638,446 A    6/1997   Rubin
5,768,382 A    6/1998   Schneier (Continued)

FOREIGN PATENT DOCUMENTS

CN    103429302    12/2013
JP    2000-040045    2/2000

(Continued)

OTHER PUBLICATIONS

PCT/US07/006628, International Search Report and Written Opinion mailed Sep. 12, 2008.

(Continued)

*Primary Examiner* — Leslie Wong
(74) *Attorney, Agent, or Firm* — Lewis Roca Rothgerber LLP

(57) ABSTRACT

A system and method for actively validating a network device is provided. Nodes in a network game community are prompted to engage in interrogation and response to facilitate the identification of nodes operating with hacked, modified and non-typical game configurations. In one embodiment, a query is presented to a user's machine which triggers a response, and where the response indicates whether certain data at the user is valid and wherein invalid data is suggestive of illegal community behavior. Functions are triggered and data is queried to determine whether the state of game environment is operating according to known metrics or constraints.

15 Claims, 5 Drawing Sheets

(51) Int. Cl.
*A63F 13/98* (2014.01)
*A63F 13/20* (2014.01)

(56) References Cited

U.S. PATENT DOCUMENTS

| | | | |
|---|---|---|---|
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,949,876 A | 9/1999 | Ginter et al. |
| 5,970,143 A | 10/1999 | Schneier |
| 5,982,891 A | 11/1999 | Ginter et al. |
| 6,021,219 A | 2/2000 | Andersson et al. |
| 6,134,237 A | 10/2000 | Brailean et al. |
| 6,165,072 A | 12/2000 | Davis |
| 6,237,786 B1 | 5/2001 | Ginter et al. |
| 6,253,193 B1 | 6/2001 | Ginter et al. |
| 6,363,488 B1 | 3/2002 | Ginter et al. |
| 6,389,402 B1 | 5/2002 | Ginter et al. |
| 6,405,104 B1 | 6/2002 | Dougherty |
| 6,427,140 B1 | 7/2002 | Ginter et al. |
| 6,640,304 B2 | 10/2003 | Ginter et al. |
| 6,658,568 B1 | 12/2003 | Ginter et al. |
| 6,779,004 B1 | 8/2004 | Zintel |
| 6,829,634 B1 | 12/2004 | Holt et al. |
| 6,850,252 B1 | 2/2005 | Hoffberg |
| 6,850,909 B1 | 2/2005 | Aiello et al. |
| 6,865,735 B1 | 3/2005 | Sirer et al. |
| 6,948,070 B1 | 9/2005 | Ginter et al. |
| 7,043,641 B1 | 5/2006 | Martinek et al. |
| 7,051,212 B2 | 5/2006 | Ginter et al. |
| 7,069,451 B1 | 6/2006 | Ginter et al. |
| 7,076,652 B2 | 7/2006 | Ginter et al. |
| 7,168,089 B2 | 1/2007 | Nguyen et al. |
| 7,169,050 B1 | 1/2007 | Tyler |
| 7,288,027 B2 | 10/2007 | Overton |
| 7,367,888 B1 | 5/2008 | Chen |
| 7,392,422 B2 | 6/2008 | Van Datta et al. |
| 7,480,656 B2 | 1/2009 | Harris et al. |
| 7,515,718 B2 | 4/2009 | Nguyen |
| 7,517,282 B1 | 4/2009 | Pryor |
| 7,543,152 B2 | 6/2009 | Hamalainen et al. |
| 7,584,154 B1 | 9/2009 | Chen et al. |
| 7,610,505 B2 | 10/2009 | Datta |
| 7,695,370 B2 | 4/2010 | Liu |
| 7,720,962 B2 | 5/2010 | Gupta |
| 7,753,795 B2 | 7/2010 | Harris et al. |
| 7,780,526 B2 | 8/2010 | Nguyen |
| 7,801,957 B2 | 9/2010 | Guo |
| 8,032,502 B2 | 10/2011 | Harris et al. |
| 8,033,913 B2 | 10/2011 | Cockerille et al. |
| 8,057,298 B2 | 11/2011 | Nguyen et al. |
| 8,065,394 B2 | 11/2011 | Crowder et al. |
| 8,115,765 B2 | 2/2012 | Sommers |
| 8,137,200 B2 | 3/2012 | Kelly et al. |
| 8,251,810 B2 | 8/2012 | Van Luchene |
| 8,622,837 B2 | 1/2014 | Harris |
| 8,626,710 B2 | 1/2014 | Harris |
| 8,715,072 B2 | 5/2014 | Harris |
| 2001/0044339 A1 | 11/2001 | Cordero et al. |
| 2002/0075805 A1 | 6/2002 | Gupta et al. |
| 2002/0078464 A1 | 6/2002 | Dravida et al. |
| 2002/0085552 A1 | 7/2002 | Tandom |
| 2002/0184310 A1 | 12/2002 | Traversat et al. |
| 2003/0027639 A1 | 2/2003 | Peterson et al. |
| 2003/0070070 A1 | 4/2003 | Yeager et al. |
| 2003/0078103 A1 | 4/2003 | LeMay et al. |
| 2003/0137110 A1 | 7/2003 | Huard et al. |
| 2003/0176218 A1 | 9/2003 | LeMay et al. |
| 2003/0195025 A1 | 10/2003 | Hill |
| 2003/0216962 A1 | 11/2003 | Heller et al. |
| 2003/0226007 A1 | 12/2003 | Olson et al. |
| 2003/0229789 A1 | 12/2003 | Morais et al. |
| 2004/0093372 A1 | 5/2004 | Chen et al. |
| 2004/0127277 A1 | 7/2004 | Walker et al. |
| 2004/0166942 A1 | 8/2004 | Muir |
| 2004/0193919 A1 | 9/2004 | Dabbish et al. |
| 2004/0242321 A1 | 12/2004 | Overton |
| 2004/0259633 A1 | 12/2004 | Gentles et al. |
| 2005/0086288 A1 | 4/2005 | Datta et al. |
| 2005/0086369 A1 | 4/2005 | Mai et al. |
| 2005/0101374 A1 | 5/2005 | Acres |
| 2006/0063590 A1 | 3/2006 | Abassi et al. |
| 2006/0089200 A1 | 4/2006 | Twerdahl |
| 2006/0100010 A1 | 5/2006 | Gatto et al. |
| 2006/0190281 A1 | 8/2006 | Kott et al. |
| 2006/0221825 A1 | 10/2006 | Okano |
| 2007/0066398 A1 | 3/2007 | Rowan |
| 2007/0210929 A1 | 9/2007 | Sabata et al. |
| 2007/0218996 A1 | 9/2007 | Harris et al. |
| 2007/0238528 A1 | 10/2007 | Harris et al. |
| 2007/0276521 A1 | 11/2007 | Harris et al. |
| 2007/0294399 A1 | 12/2007 | Grossner et al. |
| 2008/0305869 A1 | 12/2008 | Konforty et al. |
| 2008/0313346 A1 | 12/2008 | Kujawa et al. |
| 2009/0113515 A1 | 4/2009 | Zalewski |
| 2010/0029370 A1 | 2/2010 | Robinson et al. |
| 2010/0197405 A1 | 8/2010 | Douceur et al. |
| 2011/0269547 A1 | 11/2011 | Harris et al. |
| 2012/0088585 A1 | 4/2012 | Harris et al. |
| 2012/0108327 A1 | 5/2012 | Tandon |
| 2014/0100027 A1 | 4/2014 | Harris |
| 2014/0309024 A1 | 10/2014 | Harris |

FOREIGN PATENT DOCUMENTS

| | | |
|---|---|---|
| JP | 2004-021549 | 1/2004 |
| JP | 2004-164640 | 6/2004 |
| JP | 2006-006473 | 1/2006 |
| JP | 2014-502175 | 1/2014 |
| WO | WO 2007/109130 | 9/2007 |
| WO | WO 2012/060900 | 5/2012 |

OTHER PUBLICATIONS

Extended European Search Report for EP 07753269.5 mailed Oct, 6, 2011.
U.S. Appl. No. 11/386,039 Office Action mailed Mar. 17, 2008.
U.S. Appl. No. 11/415,881, Office Action mailed Mar. 6, 2014.
U.S. Appl. No. 11/415,881 Final Office Action mailed Dec. 8, 2009.
U.S. Appl. No. 11/415,881, Office Action mailed Jun. 3, 2009.
U.S. Appl. No. 11/415,881 Final Office Action mailed Oct. 15, 2008.
U.S. Appl. No. 11/415,881 Office Action mailed Feb. 22, 2008.
U.S. Appl. No. 11/449,141 Final Office Action mailed May 27, 2010.
U.S. Appl. No. 11/449,141 Office Action mailed Dec. 15, 2009.
U.S. Appl. No. 11/449,141 Final Office Action mailed Aug. 6, 2009.
U.S. Appl. No. 11/449,141 Office Action mailed Feb. 6, 2009.
U.S. Appl. No. 11/449,141 Office Action mailed Sep. 15, 2008.
U.S. Appl. No. 11/725,175 Final Office Action mailed Dec. 9, 2009.
U.S. Appl. No. 11/725,175 Office Action mailed Jun. 3, 2009.
U.S. Appl. No. 12/352,590 Office Action mailed Feb. 1, 2011.
U.S. Appl. No. 13/098,470 Office Action mailed Aug. 1, 2013.
U.S. Appl. No. 13/098,470 Final Office Action mailed Aug. 6, 2012.
U.S. Appl. No. 13/098,470 Office Action mailed Feb. 22, 2012.
U.S. Appl. No. 13/252,150 Final Office Action mailed Dec. 17, 2012.
U.S. Appl. No. 13/252,150 Office Action mailed Jun. 7, 2012.
U.S. Appl. No. 12/917,642 Final Office Action mailed Jun. 12, 2013.
U.S. Appl. No. 12/917,642 Office Action mailed Mar. 11, 2013.
U.S. Appl. No. 12/917,642 Office Action mailed Nov. 5, 2012.
U.S. Appl. No. 14/101,870, Adam P. Harris, Managing Game Metrics and Authorizations, filed Dec. 10, 2013.
"First Pit and Heartfelt . . . about Game Zone cheaters [Archive]—Straight Dope Message Board," Jun. 2, 2003, Straight Dope, available at ,http://board.straightdope.com/sdmb/archive/index.php?t-188189.html.>.
Bjorn et al., Christoph, "Punkbuster for Server Administrators—America's Army Edition." Even Balance, Inc. <http://www.punkbuster.com/publications/aa-ad/index.htm> Nov. 11, 2004.
Cronin et al., Eric, "Cheat-Proofing Dead Reckoned Multiplayer Games (Extended Abstract)." In Proc. ADCOG 2003. <http://warriors.eecs.umich.edu/games/papers/adcog03-cheat.pdf> Jan. 2003.

(56) References Cited

OTHER PUBLICATIONS

Delap et al., Margaret, "Is Runtime Verification Applicable to Cheat Detection?" SIGCOMM '04 Workshops. <http://conferences.sigcomm.org/sigcomm/2004/workshop_papers/net606-delap1.pdf> Aug. 30 & Sep. 3, 2004.

Dunsmore, Stuart "Punkbuster Server Manual (beta) version 0.947." Even Balance, Inc. <http://www.web.archive.org/web/20020211181729/www.evenbalance.com/pbmanual/serverman.htm> 2000-2001.

Emons, Winand "Escalating Penalties for Repeat Offenders," Oct. 2003.

Gauthier et al, Paul, "Dealing with Cheaters in Anonymous Peer-to-Peer Networks." University of Washington, Technical Report Apr. 1, 2003. Jan. 15, 2004.

Lomont, Chris "Secure Channel Communication," 2009, retreived from <http://www.lomont.org/Math/Papers/2009/Secure%20Channel%20Communication.pdf.

Rojas, Peter "Microsoft Locks Modded Xboxes out of Xbox Live," Nov. 11, 2004, Engadget.

World of Warcraft, "Game Manual." Blizzard Entertainment. <http://replacementdocs.com/download.php?view.2488> Oct. 27, 2004.

World of Warcraft, "Terms of Use." Blizzard Entertainment. <http://web.archive.org/web/20050304021845/www.worldofwarcraft.com/legal/termsofuse.html> Oct. 27, 2004.

PCT/US11/35587, International Search Report and Written Opinion mailed Aug. 9, 2011.

Extended European Search Report for EP 07753269.5 mailed Oct. 6, 2011.

U.S. Appl. No. 14/313,553, Adam P. Harris, Invalidating Network Devices With Illicit Peripherals, filed Jun. 24, 2014.

U.S. Appl. No. 12/917,642 Office Action mailed Dec. 5, 2014.

DEFINING NEW RULES FOR VALIDATION OF NETWORK DEVICES

CROSS-REFERENCE TO RELATED APPLICATIONS

The present application is a continuation and claims the priority benefit of U.S. patent application Ser. No. 13/252,150 filed Oct. 3, 2011, now U.S. Pat. No. 8,626,710, which is a continuation and claims the priority benefit of U.S. patent application Ser. No. 12/352,590 filed Jan. 12, 2009, now U.S. Pat. No. 8,032,502, which is a continuation and claims the priority benefit of U.S. patent application Ser. No. 11/386,039 filed Mar. 20, 2006, now U.S. Pat. No. 7,480,656. The disclosures of the aforementioned applications are incorporated herein by reference.

The present application is related to U.S. patent application Ser. No. 11/415,881 filed May 1, 2006, U.S. patent application Ser. No. 11/449,141 filed Jun. 7, 2006, and U.S. patent application Ser. No. 11/725,175 filed Mar. 16, 2007.

BACKGROUND OF THE INVENTION

1. Field of the Invention

The present invention relates, generally, to network gaming and more particularly to systems and methods for validating game users and devices in a network community of game players.

2. Description of the Related Art

Conventionally, users of electronic games compete with one another by selecting a two-player option associated with a particular electronic game via a single home gaming console. Accordingly, two players can play at the same time or one-at-a-time in order to compete for points or other awards associated with the particular electronic game.

As electronic game consoles have become more popular and network technologies have become more pervasive, more options for head-to-head competition are provided. Some electronic game consoles are equipped with modems or other network connectors for allowing users to communicate over a network through the exchange of data related to the game. By communicating over a network, users can connect to various other users' gaming consoles either directly or via intermediate computing nodes (e.g., a central server or other game consoles in a network) and compete against those various other users while playing a network game.

Disadvantageously, some users manipulate the network game in order to gain unfair advantages while competing with other users playing the same network game. For example, a user may slow or delay the rate at which the user's data is sent to other users so that the various other users do not receive the user's data in time to react appropriately.

Unscrupulous users may employ an external hardware device that manipulates the generation of or access to certain game data whereby a game character may be endowed with special powers or abilities or attributes (e.g., lives, ammunition, and weapons) not genuinely earned during game play. Similarly, a game character may become impervious (e.g., invisible) to attacks by other game players.

Certain software methodologies exist (either alone or in conjunction with the aforementioned hardware devices) wherein code is temporarily or permanently installed and/or modified in a gaming device allowing for similar advantages. Various other means and methods are known and employed by users in order to cheat or gain an unfair advantage during the course of networked 'community' game-play.

Cheating decreases user enjoyment of participating in a networked community game environment. For example, a particular user playing a network game without any illicit outside aides (e.g., cheat codes, hacks and so forth) is at a distinct disadvantage versus a user who is making use of such illicit aides. The user who is not cheating may be overpowered, outgunned, or otherwise inferior in some respect to a user who is cheating regardless of the individual skills of those users. If the user who does not cheat is continually defeated by a user who does cheat—and often in quick and decisive fashion—the non-cheating user may lose interest in a particular game, a particular game network, or a particular product or service provider.

This loss of interest adversely affects game developers and network service providers who will sell less game titles or find fewer users utilizing their network game services, respectively. As such, there is an inherent interest for game developers, service providers and honest game users to identify and eliminate cheating in a network or community game environment.

SUMMARY OF THE PRESENTLY CLAIMED INVENTION

The present invention provides a system and method for actively validating network game users with respect to engaging in unfair or illicit game play (i.e., cheating).

According to one embodiment of the present invention, at least one query is sent to one or more users to determine whether unfair, illicit or otherwise disingenuous game play has occurred or is in progress as reflected by certain data residing at the user's gaming device. A response to the at least one query is received whereby it is determined whether the one or more users are valid users (i.e., not cheating). The response to the at least one query is indicative of the nature of game play in progress (i.e., whether the at least one user is engaged in unfair game play activity).

Additional embodiments of the present invention advantageously allow for identification of hacking or modification of game data stores or game console hardware.

Other embodiments of the present invention allow for active validation of network game users through a server query, a peer query, a peer-group query or a combination thereof.

Still further embodiments of the present invention utilize a query that tests user integrity, such as confirming the location of functions in memory, memory hashing, profiling of threads operating on a user game console or combinations thereof.

DETAILED DESCRIPTION

Figure 1:
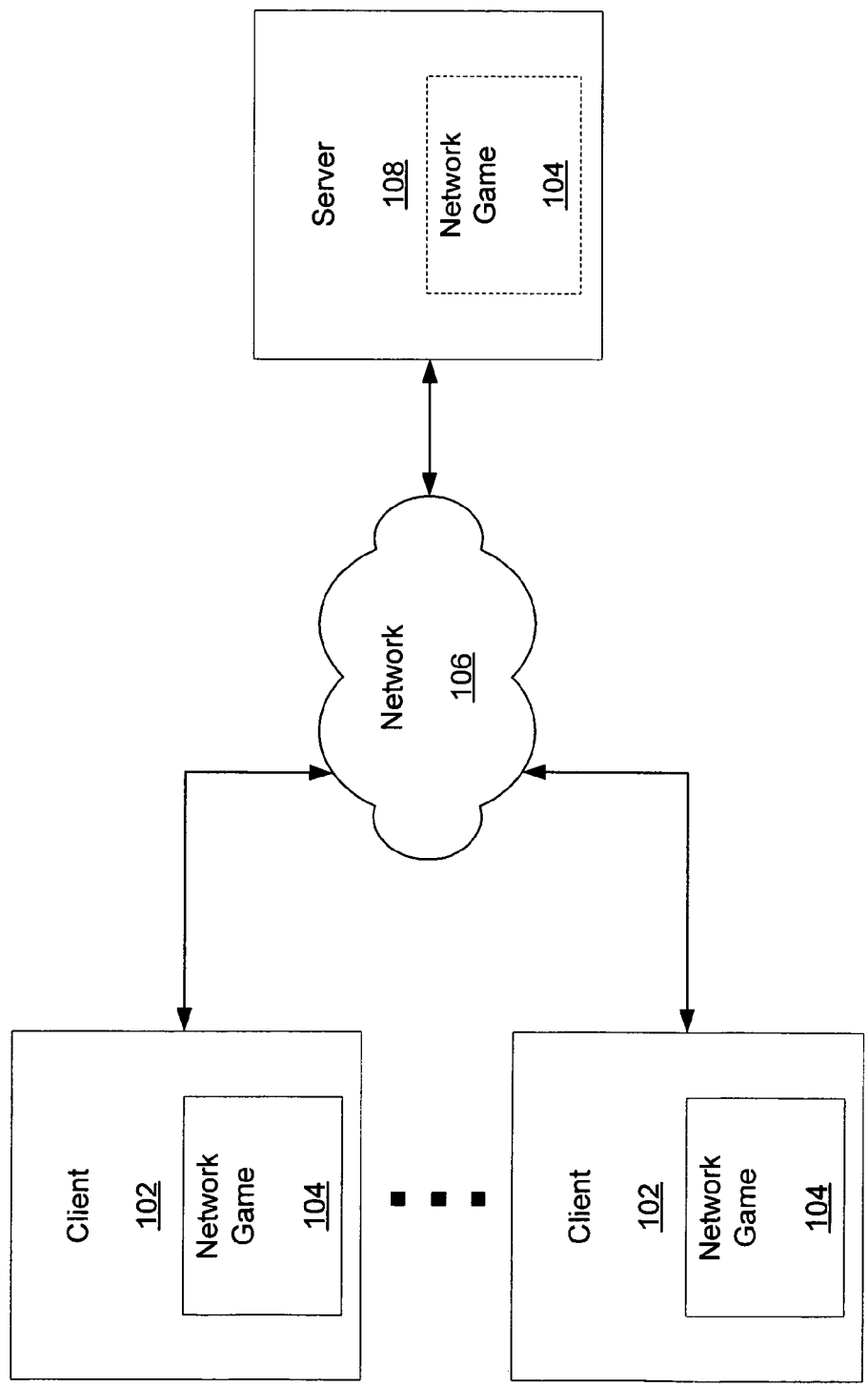
FIG. 1 illustrates a schematic diagram of an exemplary architecture for validating network users according to some embodiments of the present invention.

FIG. 1 illustrates a schematic diagram of an exemplary architecture for validating network game users according to some embodiments of the present invention. One or more clients 102 include one or more network games 104. Network game 104 may be built-in (e.g., pre-loaded) to the client 102 or be introduced through an optical disk or other data storage medium. Network game 104 may also be obtained over a network as further discussed herein. The client 102 is connected to a server 108 via a communications network 106.

The client may comprise 102 a game console such as a PlayStation® 3, a laptop computing device, a portable game device such as the PlayStation® Portable, a desktop computing device, a cellular telephone, or any other device capable of executing the network game 104 and connecting to the network 106. In some embodiments, the client 102 is identified by an identification number such as a client ID or an address mechanism such as an IP address. In other embodiments, a user of the client 102 may 'sign on' to a network with a user name and/or password and may be temporarily associated with the client 102.

In some embodiments of the present invention, the server 108 includes the network game 104 and the clients 102 access the network game 104 on the server 108 via the network 106. The network game 104 on the server 108 may be the entire game, a portion of the game, data related to the game or simply a node allowing for the pass though, observation and/or collection of data related to the game as the game is played by users in the game community. The network game 104 may be similarly organized at various clients 102 (e.g., portions of the game or game data related to the game). Network game 104 may also be provided through, for example, a third-party content library server. In such an embodiment, the library server may or may not be a participating member of the validation architecture.

It should be understood that the reference to a client 102 and a server 108 is merely for the convenience of understanding the present invention. Embodiments of the present invention may be implemented in the context of a peer-to-peer network, a client-server network, or within a peer-group (e.g., a specified group of peers). Therefore, in some instances, a client 104 may function as a server 108 and vice versa depending on the timing and the nature of a data exchange. For example, various clients in a peer-to-peer network may each comprise a portion of a network game 104 or data related to that game and may send and receive the same. As such, any reference to a client 104 or a server 108 is meant to be inclusive of operations performed by one or both entities unless specified otherwise by a particular limitation in the claims. In some instances, a device with client/server functionality may be referred to by the generic moniker, 'network node' or 'computing node.' In that regard, client 102 and server 108 may both be considered network or computing nodes.

The network game 104 comprises any software that may be processed on or by the client 102 and that allows for communication and data exchanges with the other clients 102 and server 108 via the network 106. The network 106 may include, for example, the Internet. Other proprietary or closed networks may be used either exclusively or in conjunction with the Internet. Certain security protocols (e.g., SSL or VPN) or encryption methodologies may be used to ensure the security of data exchanges over network 106, especially if the network 106 is a publicly accessible network such as the Internet.

Users associated with each of the clients 102 can interact with other users playing the network game 104. Accordingly, the users at each of the clients 102 can compete with one another despite not being physically present with one another or sharing a common gaming device or console.

In one exemplary embodiment, the server 108 monitors the users playing the network game 104 via the network 106. The clients 102 can request data from the server 108, such as information pertinent to the particular network game 104 being played, bug patches, and so forth. Any type of communication exchange between the clients 102 and the server 108 is within the scope of the various embodiments. Further, in some embodiments of the present invention, more than one server 108 may be connected to the network 106 for the purpose of communicating with the clients 102. For example, back-up or redundancy servers as well as servers with particular tasks such as storing identification information or preferences related to a particular user as well as servers tasked with certain DRM, advertising, or payment responsibilities.

In other embodiments of the present invention, the clients 102 monitor the network games 104 being played by the other clients 102 (e.g., as individual nodes in a peer-to-peer network or peer-group network). The clients 102 can communicate data generated during the monitoring process to the server 108 or the clients 102 can store and process the data, themselves. For example, in a peer-to-peer network scenario, each of the nodes in the network can monitor other nodes in the network for certain illicit behaviors.

The validation process implemented by the server 108, clients 102, and/or any one of a variety of nodes in the network detects cheating or unusual activity with respect to the network game 104. For example, a game character may accrue more points than allowed or normally allotted, the game character may possess stronger powers than the network game 104 generally provides, and so forth. Any type of unusual behavior or activity may be detected via the monitoring process discussed herein (e.g., passive validation), as result of random queries (e.g., active validation) or a combination of the two (e.g., hybrid validation).

Figure 2:
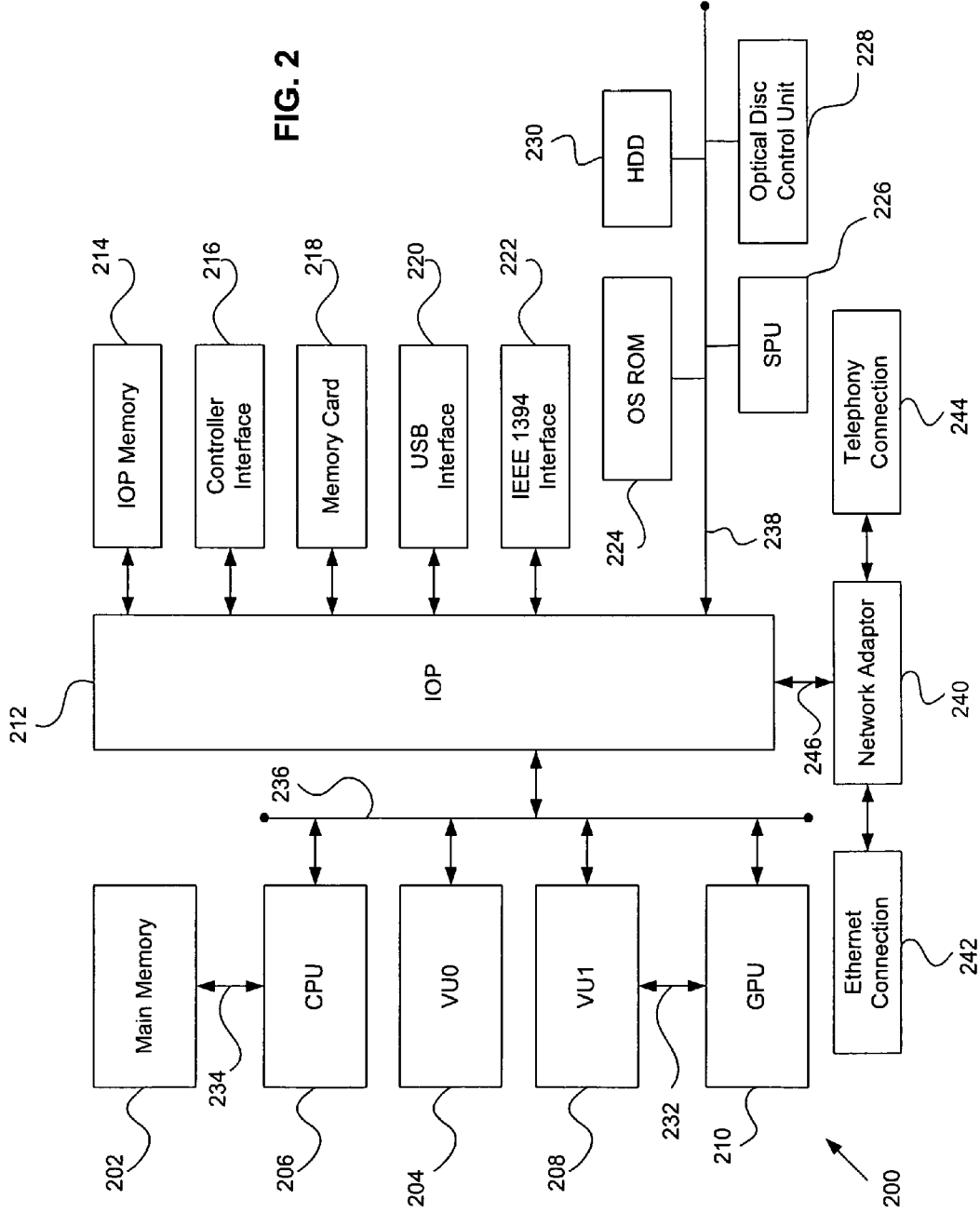
FIG. 2 illustrates a block diagram of an exemplary electronic entertainment system according to some embodiments of the present invention.

Referring now to FIG. 2, a block diagram of one embodiment of an exemplary electronic entertainment system 200, such as may constitute client 102 and for playing the network game 104 in accordance with one embodiment of the invention is shown. The system 200 may comprise, but is not limited to, a main memory 202, a central processing unit (CPU) 206, vector processing units VU0 204 and VU1 208, a graphics processing unit (GPU) 210, all of which may be coupled via a bus 236 to an input/output processor (IOP) 212. The system 200 may also comprise an IOP memory 214, a controller interface 216, a memory card 218, a Universal Serial Bus (USB) interface 220, and an IEEE 1394 interface 222. The system 200 may further include an operating system read-only memory (OS ROM) 224, a sound processing unit (SPU) 226, an optical disc control unit 228, and a hard disc drive (HDD) 230, all of which may be connected via a bus 238 to IOP 212.

Some embodiments of the system 200 may also include a network adaptor 240, which may offer an Ethernet connection 242 and/or telephony connection 244. The system 200 is, in one embodiment, an electronic gaming console; however, the system 200 (or portions thereof) may also be implemented as a general-purpose computer, a set-top box, a hand-held gaming device, or in a mobile device such as a cellular phone. It should further be noted that various other system architectures may be utilized within the scope of the present invention. For example, the computer architecture and high speed processing model disclosed in U.S. patent publication number 2002-0138637 for a "Computer Architecture and Software Cells for Broadband Networks," the disclosure of which is incorporated herein by reference.

The CPU 206, the VU0 204, the VU1 208, the GPU 210, and the IOP 212 communicate via a system bus 236. The CPU 206 communicates with the main memory 202 via a dedicated bus 234. The VU1 208 and the GPU 210 may also communicate with one another via a dedicated bus 232. The CPU 206 executes programs stored in the OS ROM 224 and the main memory 202. The main memory 202 may contain pre-stored programs and may also contain programs transferred via the IOP 212 from a CD-ROM, DVD-ROM, or other optical disc (not shown) using the optical disc control unit 228. The IOP 212 controls data exchanges between the CPU 206, the VU0 204, the VU1 208, the GPU 210 and other devices of the system 200, such as the controller interface 216, or from other such systems via the network adaptor 240.

The GPU 210 executes drawing instructions from the CPU 206 and the VU0 204 to produce images for display on a display device (not shown). The VU1 208 transforms objects from three-dimensional coordinates to two-dimensional coordinates, and sends the two-dimensional coordinates to the GPU 210. The SPU 226 executes instructions and processes data to produce sound signals that are output on an audio device (not shown).

A user of the system 200 provides instructions via the controller interface 216 to the CPU 206, which may be coupled to a control device comprising a joystick, directional buttons, and/or other control buttons. For example, the user may instruct the CPU 206 to store certain game information on the memory card 218, which may be removable (e.g., a flash memory or other non-volatile memory card), or may instruct a character in a game to perform some specified action. Other devices may be connected to the system 200 via the USB interface 220 and the IEEE 1394 interface 222, such as an external hardware device allowing for illicit gaming behavior (i.e., cheating).

Some embodiments of the system 200 may comprise a network adaptor 240. The network adaptor 240 provides the hardware functionality necessary for the system 200 to connect to a network. The network adaptor 240 may comprise, for example, a system connector that operates to connect the adaptor 240 to the system 200 through an expansion bus connector 246. The network adaptor 240 may also comprise a power connector and data connector to allow for the provisioning of power from the system 200 to the adaptor 240 and the exchange of data between the system 200 and the adaptor 240. In some embodiments of the present invention, the network adaptor 240 may also require the installation of certain software in the system 200 to allow for identification and connection to a particular IP address and/or dial-up to a particular Internet Service Provider. Software may also provide other functionalities, such as the creation and maintenance of user profiles, in addition to functional interaction between the system 200 and the network adaptor 240.

The network adaptor 240 may also comprise an Ethernet connection 242. Through the Ethernet connection 242, a network cable (e.g., a 100 Base-TX or 10-Base T) may be coupled to the network adaptor 240 for connection to a network. The network cable may, for example, be communicatively coupled to a DSL or cable modem. The network cable may also be communicatively coupled to, for example, a router via a LAN port; the router may then be coupled to a DSL or cable modem through a WAN port. In further embodiments, the Ethernet connection 242 may allow for a network cable to be connected to a wireless Ethernet bridge. The wireless Ethernet bridge may be communicatively coupled to a wireless router utilizing, for example, an 802.11x protocol. The wireless router may be further communicatively coupled to a cable or DSL modem.

The network adaptor 240 may also comprise a telephony connection 244. Through the telephony connection 244, a standard telephone line with, for example, an RJ-11C telephone connector may be connected to the network adaptor 240 and a telephone wall jack. In this regard, the network adaptor 240 may further comprise modem functionality such that the system 200 may communicate data over the public switched telephone network via the telephony connection 244.

Other network connection methodologies and system architectures may be implemented, like those disclosed in commonly owned U.S. patent application Ser. No. 10/059,837 for a "System and Method for Distributing Data between a Telephone Network and an Entertainment Network," the disclosure of which is incorporated herein by reference.

Figure 3:
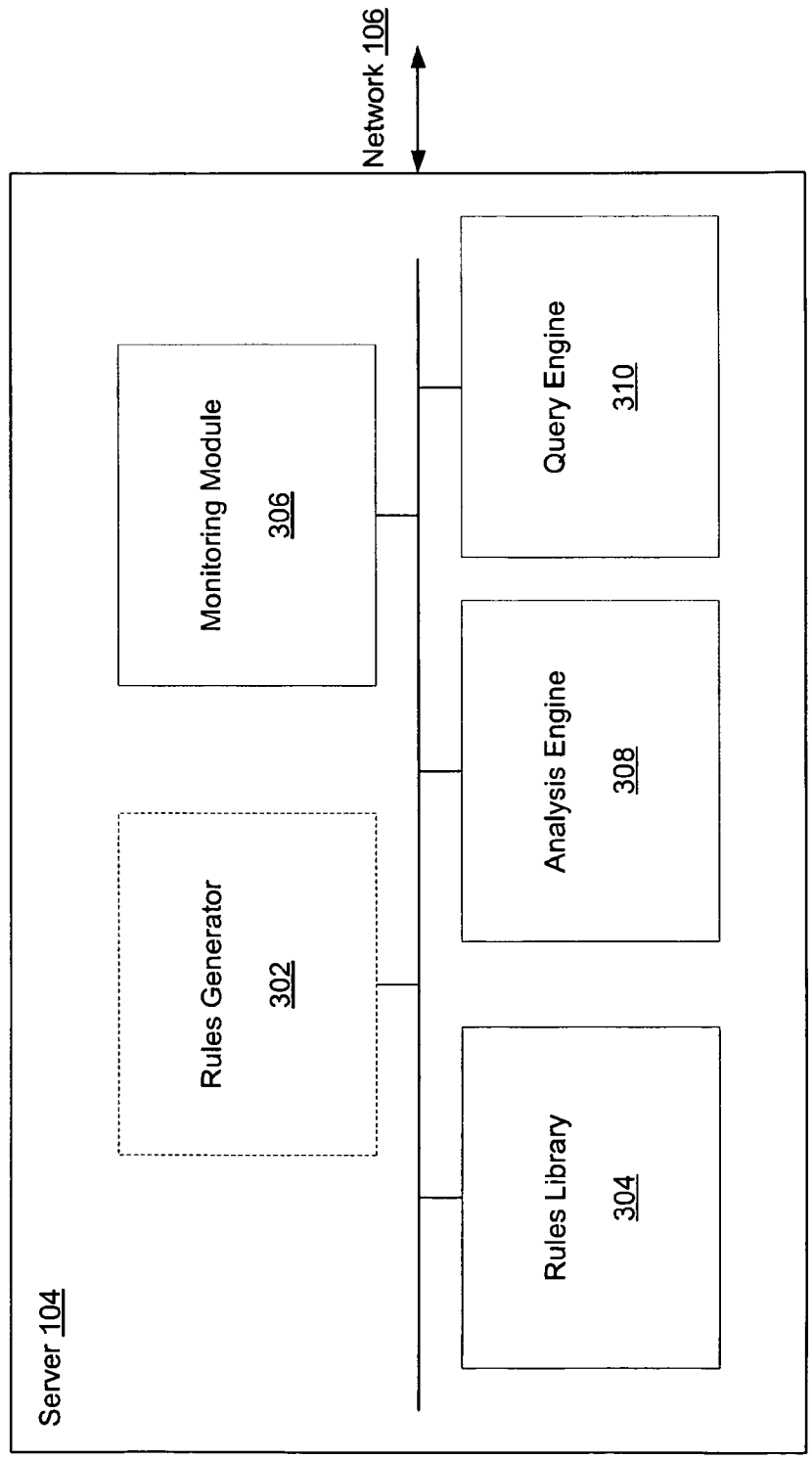
FIG. 3 illustrates an exemplary server or sending node according to some embodiments of the present invention.

FIG. 3 shows an exemplary network node, such as the server 104 discussed in FIG. 1, according to some embodiments of the present invention. An optional rules generator 302 creates and/or processes rules associated with the network game 104. The rules may include, for example, parameters for a game environment. In some embodiments, the rules include, but are not limited to, appropriate character fatigue, speed, character strength, goals, power, ammunition, temporal variables, score ranges, prerequisites for advancement, frequency, and so forth. A rule may encompass any quantifiable limitation of the game environment or a character in the game environment (e.g., a user starting a game with ten lives when the game defaults to three).

Similarly, rules may encompass any identifiable aspect of the gaming environment or the hardware and/or software related to generating that environment. For example, the overwriting or modification of certain code in main memory 202, the presence of certain hardware devices with a particular device signature present in system 200 via USB Interface 220 or IEEE 1394 Interface 222 or the presence of certain data on a memory card 218 may be subject to a rule (e.g., prohibiting the presence of devices evidencing a particular signature). The receipt of or presence of remnants of certain instruction threads including number, location or specific characteristics in, for example, main memory 202 or IOP memory 214 may also be subject to rules validation (e.g., cheating may not immediately be occurring but the presence of prior instruction threads related to cheating indicate cheating did at one point occur). The blocking of the transmission or receipt of particular data via network adaptor 240 may also constitute the basis for a rule (e.g., prohibitions of particular data transfers indicate cheating).

Rules are inclusive and may be independently generated by the optional rules generator 302 or otherwise related to data provided to the rules generator 302 (e.g., by a game developer). Optional rules generator 302, in this regard, may observe (e.g., through monitoring module 306) certain game parameters and develop a rule based on its observations of a particular network game 104. For example, the generator 302 may observe that gaining access to a particular level always requires meeting certain prerequisites. The generator 302 may develop a rule reflecting that if a user has achieved access to that particular level and has not met those prerequisites, that user is cheating. Those prerequisites may be observed by the generator 302 and/or related to information provided to the generator 302.

A rules library 304 is provided for storing the pre-defined or generated rules. Various other data may be stored in the rules library 304 according to some embodiments of the present invention. For example, statistics about one or more users of the network game 104 may be stored in the rules library 304, or any other storage medium or locale, according to some embodiments of the present invention. Alternative storage of statistics or other information may occur remotely from a network node but is otherwise accessible via the network 106. In some embodiments, the rules are directly input into the rules library 304 or may have been independently or cooperatively developed by the rules generator 302.

A monitoring module 306 may be configured to monitor user activity with the network game 104 at the client 102 via data exchanges with the server 104 via the network 106. Any type of monitoring may be implemented by the monitoring module 306 (e.g., periodic review of data exchanges, constant review of data exchanges, review of data exchanges from particular nodes, etc.). According to one embodiment of the present invention, the monitoring module 306 utilizes rules in the rules library 304 and analysis provided by the analysis engine 308 to passively listen for or detect user activity that deviates from typical user activity associated with the network game 104.

For example, the rules may indicate how fast a character associated with the network game 104 can move. The monitoring module 306 may observe characters in the network game 104 moving in excess of that speed and may flag one or more characters that moves faster than the rules indicate is allowed for further investigation or resolution. The monitoring module may (e.g., in hybrid validation architecture) independently activate the query engine 310 in light of this apparently illicit activity that suggests cheating and cause the query engine 310 to deliver a query to the apparently offending node to better determine whether the node is in a valid or invalid state. Such activity is referred to a hybrid validation in that validation begins passively (i.e., no active query to the offending node) but upon identification of possible illicit behavior, a query, which is generally indicative of active validation, is delivered to the offending node for a more accurate determination of valid or invalid behavior. The combination of passive (further described herein) and active validation, together, constitutes hybrid validation.

In some embodiments (e.g., in passive validation architecture), the apparently offending node may be summarily removed from the network without further investigation or data pertaining to this apparently illicit activity is logged for future use and/or analysis. Such activity is referred to as passive validation in that no proactive determination of validity is made; the determination occurs as a result of 'listening' to behavior at the node.

The monitoring module 306, in some embodiments—including both passive and hybrid validation—may forward any flags or unusual activity to the analysis engine 308. The analysis engine 308 may analyze the flagged activity to determine whether the activity is, in fact, illegal with respect to the game environment constraints of the network game 104. In other words, the analysis engine 308 determines whether the user activity, in fact, violates the rules associated with the network game 104.

For example, the network game user playing the network game 104 may play a nearly perfect game, such as achieving higher than usual scores. While, in many cases, this may be indicative of cheating, the user may simply be an above-average player. Data stored at the analysis engine 308, the rules library 304 or in another data storage locale or means (e.g., an ongoing record of particular game player activity and indicating an ongoing increase in quality of play over several sessions) may be utilized to make a determination whether this player is per se cheating or if further investigation via a query from query engine 310 is appropriate.

Analysis engine 308 may also determine that while a user of a network game 104 presently has a particular advantage, this advantage may be one actually granted by the developer of the network game 104. For example, the game developer may have implanted an 'Easter Egg' or other 'hidden' functionality or bonus in the game environment such as temporary invincibility or excess speed. Certain bonus codes may also be recognized by the network game 104 and allow for game character or game environment enhancements. The analysis engine 308, through a query to the rules library 304, may determine that this particular behavior—while in any other context of the game would constitute cheating—is, in fact, permitted since the user has uncovered the Easter Egg or otherwise input an authorized code providing for such enhanced ability. The analysis engine 308 may also determine whether such enhanced functionalities have been disabled with regard to a particular network game environment and whether that activity, in light of that condition having been presently disabled, therein constitutes cheating.

The analysis engine 308 and/or the monitoring module 306, depending upon a particular embodiment, may then instruct the query engine 310 to send one or more queries to the user's game device (system 200) in order to gather data that helps the analysis engine 308 determine whether the user activity qualifies as cheating. The query engine 310 may send predetermined queries for the particular network game 104 or the query engine 310 may generate specific queries for the network game 104 based on the user activity that is flagged by the monitoring module 306.

For example, if the flagged behavior is one that is usually coupled with a particular cheat device (e.g., an external hardware mechanism), the query engine 310 may send a query to the client 102 seeking processor threads related to that device or seek a hash of memory that is traditionally modified by that device.

The query engine 310 generates and sends queries to the client 102 on which the network game 104 is being played or that is otherwise connected to the server 108 to play the network game 104. Based on a the response to the query, analysis engine 308 determines whether a client 102 or other network node is presently, has been or is otherwise configured to engage in illegal behavior (i.e., cheating).

Queries generated by the query engine 310 are, in one exemplary embodiment, asynchronous in that they may be generated and delivered at any time. Other embodiments of the present invention, however, may utilize a particular schedule or time-table for the delivery of queries in order to, for example, optimize consumption of bandwidth. Accordingly, a query may only be generated when bandwidth consumption relative to a particular network game 104 is at an ebb versus during a high computational, high data exchange point of game play. Similarly, queries may be scheduled subject to the number of nodes present in a network; upon entry of new nodes to the network; or upon any other schedule as may be implemented by an administrator of the validation architecture.

Each node in the gaming community (e.g., client 102) is configured to receive the query and respond as set forth by a series of instructional headers in the query packet. Providing incorrect or invalid data in response to the query is construed as illicit behavior (i.e., cheating) and the invalid node may be dismissed from the community, logged, or otherwise dealt with as is determined by the particular construct of the validation architecture in place in a given community or with regard to a particular network game 104.

Failure of any particular node to respond to the query may be implicitly construed as an invalid response (i.e., the queried node did not respond because that node does not possess or cannot calculate the proper responsive data). Each query, as a part of the aforementioned instruction packet header, may reflect a time period in which a response must be generated and transmitted to the sending node. In other embodiments, the sending node may simply time the response of the query and unilaterally determine that a lack of response within a particular period of time constitutes an invalid response and therefore invalidate the queried node.

In certain networks, delivery of a response may be delayed or impossible due to a number of factors. For example, in a high traffic network, the proper and valid response may be generated by a queried node but temporarily delayed by the network due to traffic or other data priorities (e.g., the delivery of critical game data). The querying node may be configured to recognize when certain traffic conditions exist in the network and to adjust (via query engine 310) the query response time for providing a valid response.

Similar adjustments or allowances may be made in light of the particular network over which a queried node is connected to the querying node (e.g., a DSL line v. a wireless network v. a 56 kbps dial-up modem). A query and response are, at least with regard to a valid node, more readily transmitted and received over a DSL line, which comprises higher bandwidth than, for example, a dial-up modem. Similarly, if certain lightweight protocols are being used (e.g., UDP versus TCP), additional leniency may be allowed in that UDP, for example, offers few error recovery services unlike TCP, which guarantees delivery of data packets. In such a scenario, the query packet may never be received by the queried node and no indication of that failure will be communicated to the querying node. The querying node, via query engine 310, may take such possibilities into consideration, in conjunction with analysis engine 308, when determining if a response has been timely received and, further, with regard to disposing of an implicitly invalidated node.

In other embodiments of the present invention, if no response is received in response to a query, the query engine 310 may re-transmit the same query or, in order to prevent an illicit network node from having the benefit of additional processing time to determine the correct response to the query, generate a fresh query to that node. A particular node may be given so many opportunities to provide a valid response before the node is dismissed from the network or otherwise cataloged as having engaged in illicit community behavior.

The query itself is intended to determine whether a node in the community network is valid, that is, is the node running instructions or functioning as is expected (e.g., has the runtime code been modified). Various cheating mechanisms will introduce new code to the system 200, usually in main memory 202 or IOP memory 214 although code related to illicit activity may also be found on a memory card 218. Certain device signatures related to a cheat device connected to the system 200 may further be identified at USB Interface 220 or IEEE 1394 Interface 1394 222. The query seeks to determine whether known 'cheat' code is present or whether certain native runtime code at, for example, main memory 202 or IOP memory 214, has been modified as the result of a user having executed certain cheat code or the presence of a certain cheat device and its related signature, that cheat code having modified the native runtime code.

The query generated by the query engine 310, in one embodiment, may comprise requesting a section of memory from the client 102, that is, a start address and size. The client 102 then answers the query with the appropriate number of bytes of memory commencing at the particular address as requested by the query engine 310. Query engine 310, in some embodiments, will request a limited number of memory addresses in that the query aims to identify known portions of runtime code that are traditionally subject to modification or hacking with an aim toward cheating in a community network environment.

If the client 102 fails to respond to the query or provides the incorrect segment of memory as a result of the runtime code having been altered by illicit behavior (i.e., cheating), then the client 102 may be dismissed from the network or subject to other penalties or action (e.g., logging of an IP address, development of a record reflecting the client 102 or an associated user having been engaged in illicit behavior, restriction of bandwidth, etc.). A validated node (e.g., client 102) will identify a portion of memory that matches the expectations of the querying node (e.g., server 104) as reflected by a rule in rules library 304.

In another embodiment, the query engine 310 may generate a query concerning memory in the context of a hash function and at the client 102 in question. A hash function (H) is a transformation that takes a variable-size input (m) and returns a fixed-size string, which is called the hash value h (i.e., h=H(m)). The hash value concisely represents the larger data sample from which it was computed.

In the context of an embodiment of the present invention, the query generated by query engine 310 may identify a particular address and portion of memory as in previous embodiments of the present invention but further require the application of a hash function against the relevant data in memory. The response to the query (i.e., the hashed portion of memory) would then be required to match the hash value at the querying node (e.g., server 104) as might be reflected in a lookup table in rules library 304.

Hashing, as noted above, may be utilized to transform a string of characters associated with the memory requested into a shorter fixed-length value or key representative of the string. Through the use of hashing, efforts of more sophisticated hackers and cheaters are complicated in that it is nearly impossible to re-establish the original data from the hash value. A hash value is unique in the sense that two data sets are highly unlikely to result in the same bit string and any attempt to make changes to the data will negate the value and thus the signature. A hash function H is one-way in that given a hash value h, it is computationally infeasible to find some input x such that H(x)=h.

For example, applying the CRC32 hash algorithm against the data string <Sony> results in the checksum <69D07CFC>; the data string <Sony Computer Entertainment> produces the checksum <EF7F99BA>; and the data string <Sony Computer Entertainment America Inc.> results in the unique checksum <E3DE35CF>.

Examples of well-known hash functions that may be implemented in the present invention are MD2 and MD5 as reflected in Internet RFCs 1320 and 1321, which are incorporated herein by reference as well as the Secure Hash Algorithm (SHA) as is reflected in FIPS PUB 180, which is further incorporated herein by reference. CRC32 (cyclic redundancy check) is still a further example of a hash function that may be implemented in an embodiment of the present invention. Other known or later developed hash functions are within the scope of various embodiments of the present invention.

While impossible to re-establish the original data from the hash value, since a query from query engine 310 may refer to a limited number of memory addresses, it is conceivable that a hacker or cheater could independently generate a look-up table in light of a particular hash algorithm vis-a-vis a particular address and size (sometimes referred to, generally in the context of hacking computer passwords, as a dictionary attack). Thus, when a query is received concerning a particular address and size and hash algorithm, the cheater may provide the appropriate response via their look-up table. In order to overcome this possibility, some embodiments of the present invention may utilize a certain degree of randomization as to the particular memory segments queried.

Further embodiments of the present invention, as a means of overcoming independent look-up tables, may employ salting the hash as a part of the query generated by query engine 310. Salt is, in its simplest form, a unique string of some fixed length and is provided as a part of the query in the header instructions of the query packet. The memory segment identified by the query is concatenated with the salt and subsequently hashed. The possibilities of 'hacking' a response to the query are diminished almost to the point of impossibility and the time and processing power required to develop an independent look-up table on-the-fly would far exceed the response time limit to the query and the client 102 would be timed out for failure to respond to the query. A proper response will, like the memory query and memory/hash query, provide a response that matches the hash value at the querying node. Failure of the response to match that hash value will result in the queried node being designated invalid and removed from the community or otherwise addressed as is appropriate in the particular validation architecture.

The query, in some embodiments of the present invention, may further include the detection of threads as they occur through the use of certain cheat devices. A processor thread is generally recognized as the architectural state within a processor representative of a sequence of instructions. Certain devices, when installed, will introduce a series of threads in certain numbers and in certain locales in order to allow for the operation of the device in conjunction with the system 200. A query of, for example, main memory 202 or IOP memory 214 at client 102 may be related to detection of a known thread, a known number of threads, or the presence of threads in a certain location as evidence of illicit game activity (i.e., cheating) as identified by rules library 304.

In some instances, even after certain devices are removed from the system 200, the various threads related to that device will not be entirely purged from the system 200, usually main memory 202 or IOP memory 214. A query of client 102 may relate to the detection of these so-called 'ghost threads' and indicate that while a user is not immediately engaged in illicit game behavior the user may have previously engaged in such behavior and/or otherwise have the means to engage in such behavior in the future.

Queries may also pertain to identification of modules and strings of data in the system 200 as identified in the rules library 304. As these modules and strings may 'move,' especially in IOP memory 214, identification of the particular string or module versus a particular address may prove particularly useful with regard to actively validating a network device. Further, the jump locations in a particular segment of code may be 'nulled out' whereby code that has been relocated as a normal part of the IOP operation may be verified.

While any one of the aforementioned embodiments may be utilized in the context of a query, the query engine 310 may automatically determine or customize the particular query in response to activity detected by monitoring module 306 as may be the case in of passive validation architecture.

The analysis engine 308 receives the data in response to the query generated by query engine 310 and determines whether the status of a client device is invalid and reflects cheating or other illicit behavior. If the client 102 fails to respond to the query from the query engine 310, the client 102 may be ejected from the network community either temporarily or permanently. In some embodiments of the present invention, the period a client 102 or a particular user associated with the client 102 at the time of ejection may increase with the number of ejections.

As previously noted, in some embodiments of the present invention, a window of time is specified for responding to the query. If the client 102 fails to respond to the query within that window of time, the server 108 may send another query, eject the user or client 102 from the network community, or allow the user to continue participating in the network game 104 and continue to monitor the user's activity at client 102.

In some embodiments of the present invention, like those related to passive validation, the analysis engine 308—in conjunction with monitoring module 306—may decide that the query engine 310 does not need to send a query. For example, the analysis engine 308 may determine that while a score associated with the network game 104 is high, it is not outside the parameters for scores set forth in the rules associated with the network game 104 as provided in the rules library 304 and otherwise observed by the monitoring module 306.

If the analysis engine 308 determines that the user is cheating, the offending node may be ejected, allowed to continue playing, and so forth. In some embodiments, the server 108 or sending node may resolve the violation (i.e., cheating activity) whereby various types of resolution may be employed. In some embodiments of the present invention, the node tasked with resolving the behavior (e.g., server 104) may disable a cheating device or offending code presently running on the system 200 by sending a patch to remove, modify, or add to the offending software.

In some embodiments, the analysis engine 308 may generate a list of users or client devices 102 that violate the rules associated with the network game 104. In other words, the analysis engine 308 may generate a cheater 'rap sheet.' The cheating users may then be monitored more often by the monitoring module 306 according to some embodiments or employed as a variable for generating future rules by the optional rules generator 302.

In some embodiments, the client 102 may include certain or all of the components discussed in FIG. 3 with regard to server 104 whereby device becomes more of a generic network node that may encompass server functionality, client functionality, both or neither (e.g., a router, buffer or intermediate point on a network). Accordingly, the client 102 can detect cheating activity occurring on other clients 102, as discussed herein. One node in the network may also generated queries of other nodes in response to an initial request by a server 104.

Nodes may also act in peer-groups whereby, for example, ten particular nodes constitute a group. Groups may be defined by the particular needs or nature of a particular network environment. For example, a group may constitute all players of a network game 104. A group may constitute all players of a network game 104 and participating via a particular ISP. A group may also constitute players in a certain 'game room,' that is, players that have been invited to participate with one another or otherwise entered a particular gaming environment of particular users. A group may be defined by any parameter that allows for delineation of one user from another (e.g., age, experience, game device being used, time logged on, type of network connection, bandwidth availability, etc.).

Other embodiments may provide for group participation in analysis of the query response. For example, multiple sending nodes may send a query to a particular receiving node. These queries may be identical or each request different information. In some embodiments, a correct response to the various queries may be required by all or a certain percentage of the querying nodes to further ensure the validity of the queried node in the community network.

Furthermore, although various components are discussed in connection with FIG. 3, the server 104 and/or the client 102 may include more or fewer components and still fall within the scope of various embodiments of the present invention.

Figure 4:
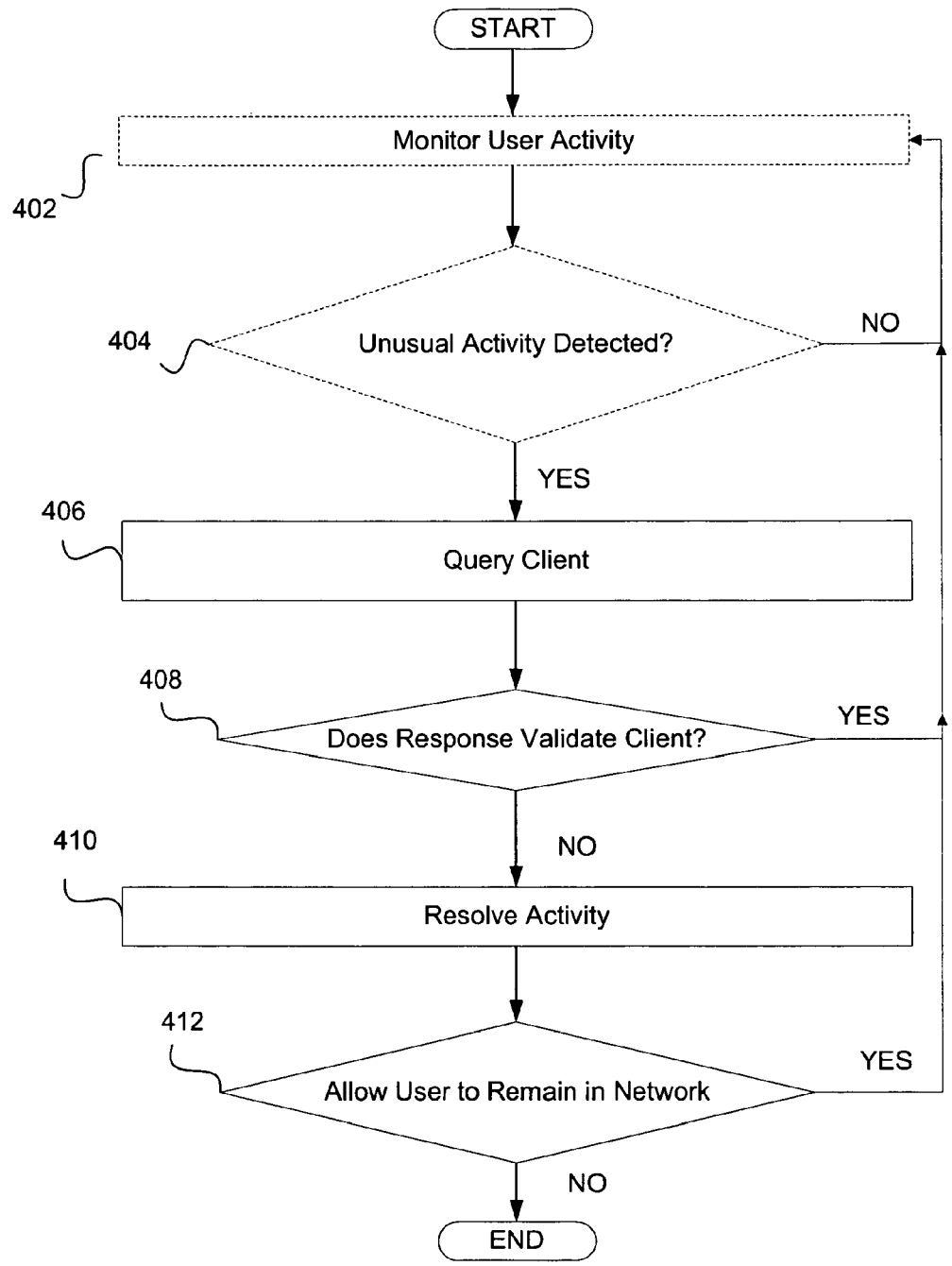
FIG. 4 illustrates a flow diagram of an exemplary process for identifying illegal network game activity according to some embodiments of the present invention.

FIG. 4 shows a flow diagram of an exemplary process for identifying illegal network game activity according to some embodiments of the present invention. The illegal network game activity may include, as discussed herein, violation of the rules associated with the network game 104 or any other cheating activity by the network game users.

At optional step 402 network game play is monitored. Monitoring of game play may, in some embodiments, only be implemented in passive validation architecture. Notwithstanding, the monitoring module 306 discussed in FIG. 3 can monitor user activity associated with the network game 104. As discussed herein, any type of monitoring, observation, and so forth may be employed.

At optional step 404, a determination whether there is anything unusual about a particular player's actions in the network game 104. Step 404 may, like step 402, be most appropriate in passive validation architecture. If no unusual activity is detected, the monitoring module 306 continues to monitor the network game user's activities in the network game 104.

If unusual activity is detected (e.g., in passive or hybrid validation architecture) or as might otherwise be scheduled or in response to a scheduled or randomized and asynchronous implementation of the query engine 310 (e.g., in active validation architecture), the query engine 310 sends a query to a client 102 (e.g., one that might be associated with unusual activity), at step 406. Based on the response to the query, the analysis engine 308 determines whether the unusual activity is illegal at step 408. If the node (e.g., client 102) is validated, the present query-response interaction comes to an end in the case of active validation architecture. In the case of passive or hybrid validation architecture, monitoring module 306 continues to monitor activity of node likes client 102 in the network.

If the node (e.g., client 102) is not validated, certain illegal activity may be resolved at step 410. As discussed herein, various resolutions may be employed, such as sending software to the node to add to, modify, or remove the offending software, warning the user at the offending node, creating a watch list concerning the offending client/user, and so forth.

At step 412, the server 108 or, in a peer-to-peer or group-peer scenario, the clients 102, determine whether to allow the network game user to continue to play in the network. If the network game user is allowed to continue to play, the node remains subject to future queries and/or monitoring in active, passive or hybrid validation architectures as is appropriate. If the network game user is not allowed to continue, the server 108 or the other clients 102 can eject the network game user, such as by ceasing data communication with the particular network game user. In some embodiments, the network game user that is not allowed to continue participating in the network game 104 is notified that the network game user is being ejected. In yet another embodiment, the network game user may be denied future participation in a particular network game or, in extreme cases, may be denied access to the gaming network or community.

Figure 5:
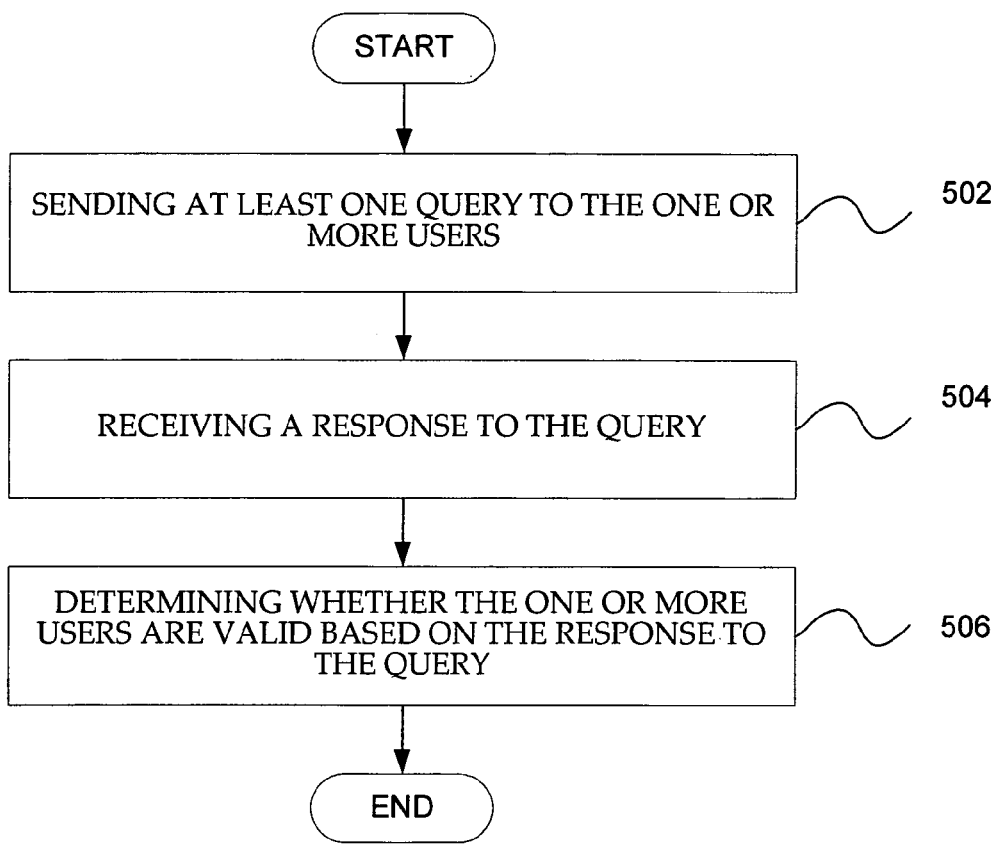
FIG. 5 illustrates a flow diagram of an exemplary process for actively validating network game users according to some embodiments of the present invention.

Referring now to FIG. 5, a flow diagram of an exemplary process for actively validating network game users is shown as may be used in conjunction with the process of FIG. 4. At step 502, a query is sent to the one or more users. The query may be sent to the client 102 associated with the one or more users based on detected unusual activity, at specified intervals without detection of unusual activity, and so forth. Any method for determining when to send a query may be employed. As discussed herein, the query may be customized according to the network game user, the query may be predetermined, and so forth. The query may also comprise any type of query, such as a query requesting a specific area of the memory associated with the network game 104 or the network game user's participation in the game, a hash of the memory or specified area of the memory, a hash of the memory and a salt associated with the memory requested, identification of threads, modules, strings of data and so forth.

At step 504, an answer to the query is received. As discussed herein, in some embodiments, the one or more users may be ejected if the client 102 fails to respond to the query either correctly and/or in a timely fashion.

At step 506, it is determined whether the one or more users are valid based on the response to the query. As discussed herein, the network game user, may be considered valid if it is determined, by an analysis engine 308 at the server 108 or the other clients 102, that the network game user is not cheating, is not violating the rules associated with the network game 104, and so on. The response to the query may be utilized to further query the network game user where the response is not acceptable, or is otherwise suspicious.

The response may be analyzed by the analysis engine 308 in order to determine whether the network game user is valid. As discussed herein, the network game user may be warned, ejected from the network game 104, monitored, and so forth. As discussed herein, the violation or cheating may be resolved according to some embodiments, such as by sending data to add to, modify, or delete the cheating device, with or without notice to the network game user. Any type of resolution is within the scope of various embodiments of the present invention.

In some embodiments, as discussed herein, a list of cheating network game users may be generated and recorded, or stored. In other embodiments, a list of validated network game users may be generated. In other words, a list of the network game users that are not determined to be cheating may be generated, those users having established trust with the community over a period of time. Accordingly, the network game users that are validated may be monitored less while the network game users that have a history of cheating may be monitored more, according to some embodiments, or as may be determined by optional rules generator 302.

While various embodiments have been described above, it should be understood that they have been presented by way of example only, and not limitation. For example, any of the elements associated with the client 102, the network game 104, and/or the server 108 may employ any of the desired functionality set forth hereinabove. Thus, the breadth and scope of a preferred embodiment should not be limited by any of the above-described exemplary embodiments.

The present invention may also be used in the context of validating certain permissions and/or copyright protections that may exist with regard to copyrighted content. Content may be validated through a query to verify whether a particular party or device has the authority to 'play' that content.

Further, the present invention may be used in the context of providing updates to various computing devices wherein it is determined that a portion of software (e.g., as may be determined through a query) is out-of-date and in need of updating or overwriting.

The present invention may be further implemented in a common network game 104 that is operable over a mixed network of end user devices (e.g., clients 102). For example, one client device 102 may be a personal computer; a second client device 102 may be a home entertainment system such as a PlayStation®2 or PlayStation®3 available from Sony Computer Entertainment Inc. Another client device 102 may be a portable gaming device such as a PSP™ (also from Sony Computer Entertainment Inc.) whereas a fourth client 102 may be a home entertainment system of a different manufacture such as an Xbox as manufactured by Microsoft Corporation or a GameCube as manufactured by Nintendo Co., Ltd. The present anti-cheat methodologies described herein are fully intended to be operable amongst a related or non-related group of devices.

What is claimed is:

1. A method for validating devices in a gaming network, the method comprising:
    maintaining in memory game play history for each of a plurality of game players in the gaming network, wherein each game player is assigned to a list of trustworthy game players or a list of cheating game players based on the stored game play history of the game player;
    sending one or more queries to one of the game players over a communication network, wherein each query is directed at gathering data regarding a game device associated with the game player; and
    executing instructions stored in memory, wherein execution of the instructions by a processor:
        updates the list of trustworthy game players or the list of cheating game players based on whether a valid query response has been received from the game player within the predetermined period of time, and
        adjusts timing of monitoring by a monitoring module of subsequent game play data from the game player, the adjustment based on whether the game player appears on the list of trustworthy game players or the list of cheating game players.

2. The method of claim 1, wherein the game device associated with the game player is one of a game console, a portable game device, laptop computing device, desktop computing device, or a cellular device.

3. The method of claim 1, wherein the list of trust-worthy game players corresponds to game players who have not been identified as having cheated or having performed unusual activity, wherein the list of cheating game players corresponds to game players who have been identified as having cheated or having performed unusual activity, and wherein definitions for cheating and unusual activity are provided for each network game and stored in memory.

4. The method of claim 1, wherein the one or more queries directed at gathering data corresponds to retrieving game play history of the game player stored at the game device for cheating or unusual activity performed by the game player as defined for the network game.

5. The method of claim 1, wherein a valid query response received from the game player within a predetermine period of time indicates that the game player is a trustworthy game player.

6. The method of claim 1, wherein no query response received from a game player within a predetermined period of time or a non-valid query response from a game player within a predetermined period of time indicates that the game player is a cheating game player.

7. The method of claim 6, further comprising retransmitting the same query request a pre-determined number of times to the same game player and determining that no response has been provided to any of the retransmissions before identifying the game player as a cheating game player.

8. The method of claim 6, further comprising retransmitting different query requests a pre-determined number of times to the same game player and determining that no response has been provided to any of the retransmissions before identifying the game player as a cheating game player.

9. The method of claim 1, wherein the predetermined period of time for a query response is based on at least one of an amount of traffic in the game network or the type of connection by the game console to the game network.

10. The method of claim 1, wherein the one or more queries directed at gathering data are triggered by one of a schedule, time table, when a new game player enters the network game or game network, or once a threshold number of game players have been reached.

11. The method of claim 1, further comprising sending a notification to a game player that they have been identified as having cheated or having performed an unusual activity.

12. The method of claim 11, further comprising sending a notification to the game player identified as having cheated or having performed an unusual activity that the game player is being ejected from the network game.

13. The method of claim 11, further comprising ejecting the game player from the network game.

14. The method of claim 1, further comprising denying the game player identified as having cheated or having performed an unusual activity access to the network game for a predetermined amount of time.

15. The method of claim 1, further comprising denying the game player identified as having cheated or having performed an unusual activity access to the game network corresponding to the network game for a pre-determined amount of time.

* * * * *